(12) United States Patent
Namvari

(10) Patent No.: US 9,695,846 B2
(45) Date of Patent: Jul. 4, 2017

(54) MICRO DAMPERS FOR PREVENTION OF UN-COMMANDED MOTION IN MECHANICAL FEEDBACK ACTUATORS

(71) Applicant: THE BOEING COMPANY, Chicago, IL (US)

(72) Inventor: Shahram Namvari, Pasadena, CA (US)

(73) Assignee: THE BOEING COMPANY, Chicago, IL (US)

( * ) Notice: Subject to any disclaimer, the term of this patent is extended or adjusted under 35 U.S.C. 154(b) by 330 days.

(21) Appl. No.: 14/496,180

(22) Filed: Sep. 25, 2014

(65) Prior Publication Data

US 2016/0091003 A1 Mar. 31, 2016

(51) Int. Cl.
| | |
|---|---|
| F15B 21/00 | (2006.01) |
| F15B 9/03 | (2006.01) |
| F15B 9/09 | (2006.01) |
| F15B 9/12 | (2006.01) |
| F02K 9/80 | (2006.01) |

(52) U.S. Cl.
CPC ............ *F15B 21/008* (2013.01); *F02K 9/805* (2013.01); *F15B 9/03* (2013.01); *F15B 9/09* (2013.01); *F15B 9/12* (2013.01)

(58) Field of Classification Search
CPC .................. F02K 9/805; F15B 9/08

USPC ..................................... 91/485, 487
See application file for complete search history.

(56) References Cited

U.S. PATENT DOCUMENTS

| | | | | |
|---|---|---|---|---|
| 3,065,735 | A | * | 11/1962 | Chaves, Jr. ............... F15B 9/17 91/387 |
| 3,473,325 | A | | 10/1969 | Vargo |
| 4,445,672 | A | | 5/1984 | Turiot |
| 4,825,745 | A | * | 5/1989 | Kuttruf .................... F15B 9/12 91/24 |
| 5,097,171 | A | | 3/1992 | Matsunaga et al. |

* cited by examiner

*Primary Examiner* — Thomas E Lazo
(74) *Attorney, Agent, or Firm* — Patterson + Sheridan, LLP

(57) ABSTRACT

Apparatus for providing mechanical feedback of a position of an actuator to a controller in a high vibration environment. The apparatus includes a member that contacts a cam surface of the actuator such that movement of the actuator and cam surface causes the member to move. The apparatus also includes a spring that exerts a force on the member toward the cam surface to maintain contact between the member and the cam surface. The apparatus also includes a damper that dampens motion of the member, thereby eliminating resonant movement of the spring and member caused by vibrations.

20 Claims, 4 Drawing Sheets

MICRO DAMPERS FOR PREVENTION OF UN-COMMANDED MOTION IN MECHANICAL FEEDBACK ACTUATORS

BACKGROUND

Field of the Invention

The present invention relates to mechanical feedback actuators, and more specifically, to a spring and damper configuration for a scissor mechanism for a mechanical feedback actuator.

Description of the Related Art

Mechanical feedback actuators can be used in applications where control feedback needs to be provided even if electrical power is lost. For example, liquid fuel rocket engines are often mounted to a space craft by gimbals, which enable the engines to pivot and provide steering control to the space craft. In the event that electrical power is lost onboard the space craft, it may be desirable for the liquid engines to center themselves so the aircraft flies straight ahead.

Mechanical feedback actuators can include a mechanical linkage between an actuator (e.g., a piston) and a controller for the actuator. When a first end of the mechanical linkage in contact with the actuator moves in response to the actuator moving, a second end of the mechanical linkage in contact with the controller can also move. The movement of the second end of the mechanical linkage can move a component of the controller to provide feedback for control of the actuator. For example, the controller may open a valve to send pressurized hydraulic fluid to displace an actuator by one inch. As the actuator reaches one inch of displacement, a corresponding motion of the second end of the mechanical linkage can exert a force that closes the valve, thereby stopping the actuator at one inch of displacement.

To provide mechanical feedback, the mechanical linkage needs to maintain contact with the actuator. Springs are often used to provide a force that pushes the mechanical linkage into contact with a feedback surface (e.g., a cam surface) of the actuator. However, springs can be susceptible to resonance. More specifically, strong vibrations can cause the springs to vibrate at a resonant frequency, which could result in the force being applied to the mechanical linkage dropping such that the mechanical linkage loses contact with the actuator. In such instances, the mechanical linkage could transmit an erroneous actuator position to the controller.

SUMMARY

According to an embodiment, a mechanical feedback actuator can include a movable actuator and a controller configured to control movement of the movable actuator. The movable actuator can include a cam surface that is movable with the movable actuator. The mechanical feedback actuator can also include a mechanical feedback linkage that is arranged in contact with the cam surface. The mechanical feedback linkage can move relative to the controller in response to movement of the movable actuator and cam surface. A position of the mechanical feedback linkage relative to the controller can indicate a position of the movable actuator to the controller. The mechanical feedback actuator can include at least one spring arranged in contact with the mechanical feedback linkage. The at least one spring can exert a biasing force on the mechanical feedback linkage toward the cam surface. The mechanical feedback actuator can include at least one damper arranged in contact with the mechanical feedback linkage to exert a damping force on the mechanical feedback linkage.

According to an embodiment, a servo actuator can include a hydraulic actuator, a controller configured to output control signals, and an electrohydraulic servovalve in hydraulic communication with the hydraulic actuator. The electrohydraulic servovalve can be in communication with the controller, and the control signals to the servovalve direct hydraulic fluid to the hydraulic actuator to actuate the hydraulic actuator. The servo actuator can also include a mechanical feedback member arranged in contact with the hydraulic actuator. The mechanical feedback member moves relative to the electrohydraulic servovalve in response to movement of the hydraulic actuator. A position of the mechanical feedback member relative to the electrohydraulic servovalve can indicate a position of the hydraulic actuator to the electrohydraulic servovalve. The servo actuator can also include at least one spring arranged in contact with the mechanical feedback member to exert a biasing force on the mechanical feedback member toward the hydraulic actuator. The servo actuator can also include at least one damper arranged in contact with the mechanical feedback member to exert a damping force on the mechanical feedback member.

According to an embodiment, a scissor linkage for providing mechanical feedback between an actuator and a controller can include a first elongate member that includes a first end, a second end, and a first pivot arranged between the first end and the second end. The scissor linkage can also include a second elongate member that includes a third end, a fourth end, and a second pivot arranged between the third end and the fourth end. The first pivot and the second pivot are coaxial with each other, and the first elongate member and the second elongate member pivot relative to each other about the respective pivots. The scissor linkage can include at least one spring arranged between the first elongate member and the second elongate member, wherein the at least one spring is arranged between the first end and the first pivot of the first elongate member and between the third end and the second pivot of the second elongate member, and wherein the at least one spring exerts a force to push the first end and the third end away from each other. The scissor linkage can also include at least one damper arranged between the first elongate member and the second elongate member, wherein the at least one damper is arranged between the first end and the first pivot of the first elongate member and between the third end and the second pivot of the second elongate member.

DETAILED DESCRIPTION

Figure 1:
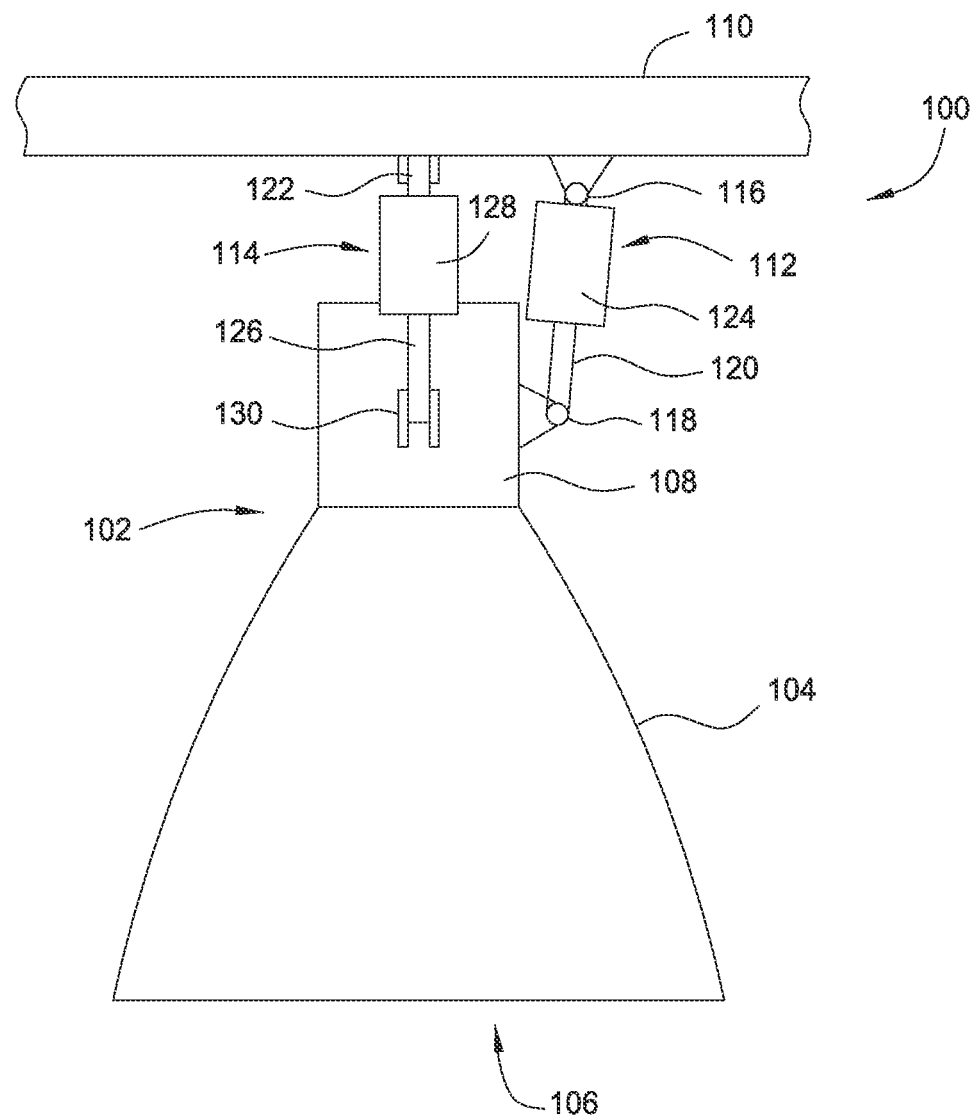
FIG. 1 is a schematic side view of a liquid fuel rocket engine.

FIG. 1 is a schematic view of a liquid rocket engine 102. The engine 102 includes various mechanisms 108 (e.g., pumps and the like) that feed liquid fuel to a combustion chamber and nozzle 104. The combusted fuel escapes from the engine 102 through the outlet 106 of the nozzle 104. The engine 102 is connected to a frame 110 of a rocket by a gimbal and actuators 112 and 114. The actuators 112 and 114 enable the engine 102 to pivot about two axes on the gimbal relative to the frame 110. The first actuator 112 includes a piston 120 that can telescopically move relative to a cylinder 124. The actuator 112 is connected to the engine 102 by a first pivot 118 and to the frame 110 by a second pivot 116. Thus, movement of the piston 120 relative to the cylinder 124 causes the engine 102 to pivot about a first axis relative to the frame 102. The second actuator 114 includes a piston 126 second telescopically move relative to a cylinder 128. The actuator 114 is connected to the engine 102 by a first pivot 130 and the frame 110 by a second pivot 122. Thus, movement of the piston 126 relative to the cylinder 128 causes the engine 102 to pivot about a second axis (perpendicular to the first axis) relative to the frame 110.

Figure 2:
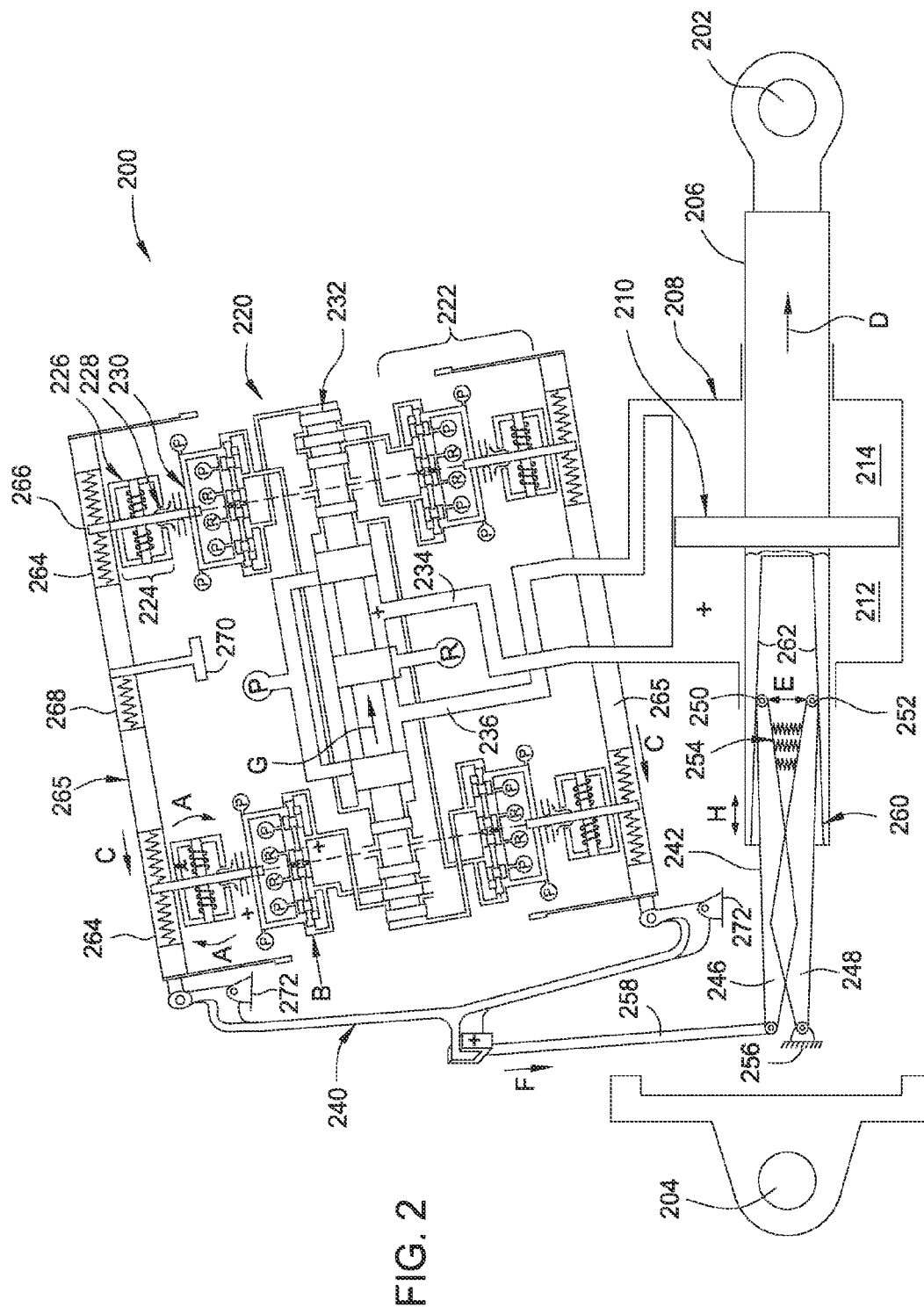
FIG. 2 is a schematic view of a hydromechanical servo-actuator.

In environments in which high reliability is important, an actuator that can provide mechanical feedback for control may be preferred over a feedback system that relies on electrical power (e.g., that uses sensors to detect position). For example, the liquid fuel rocket engines may use actuators with mechanical feedback that enable the engines to center themselves in the event of a loss of electrical power. FIG. 2 is a schematic illustration of a mechanical feedback actuator 200 that may be used on a liquid fuel rocket engine. The mechanical feedback actuator 200 includes a piston 210 inside a cylinder 208. The piston 210 is connected to a connecting rod 206, which is connected to a first pivot 202. A second pivot 204 can be connected to the cylinder 208. The piston 210 (and connecting rod 206) can move telescopically relative to the cylinder 208 by selectively pumping hydraulic fluid (or the like) into and out of chambers 212 and 214 in the cylinder. For example, to move the piston 210 and connecting rod 206 in the direction of arrow D, hydraulic fluid can be pumped into chamber 212 and out of chamber 214.

The pumping of hydraulic fluid into the chambers 212 and 214 of the cylinder 208 is controlled by an actuator control 220 that includes a power valve 232. The power valve 232 can slide in the direction of arrow G (or in the opposite direction) to selectively enable hydraulic pressure source P to be in communication with chamber 212 or chamber 214. Similarly, movement of the power valve 232 causes the other chamber 212 and 214 to be in communication with a hydraulic pressure return R. Movement of the power valve 232 is controlled by one or more servo valves 222. Multiple servo valves 222 can be used to provide redundancy for control of the power valve 232.

Under normal operation, operation of each servo valve 222 is controlled by an electrical signal. Each servo valve 222 can include a torque motor 224. An electrical current can be applied to cause an armature 226 in the torque motor 224 to twist relative to a magnet, as indicated by arrow A (or in the opposite direction). Twisting of the armature 226 causes a flexure sleeve 228 to shift laterally in the direction of arrow B (or in the opposite direction depending on the direction of current flow). Lateral shifts of the flexure sleeve 228 open valves 230, which provide communication between the hydraulic pressure source P and hydraulic pressure return R and the servo valve 222. The servo valve 222 can also move in the direction of arrow B (or in the opposite direction) to provide hydraulic pressure to faces of the power valve 232 to cause the power valve 232 to move the direction of arrow G.

The mechanical feedback actuator 200 can provide mechanical feedback to the actuator controller 220. The piston 210 can be coupled to an internal conical cam 260 that includes an inward-facing conical surface 262. The conical cam 260 is movable (in the direction of arrow H) with the piston 210 relative to the cylinder 208. A scissor linkage 242 can be arranged with a first end within the conical cam 260. The scissor linkage 242 can include a first elongate member 246 and a second elongate member 248. Rollers 250 and 252 on the first ends of the first elongate member 246 and the second elongate member 248, respectively, of the scissor linkage 242 can enable the conical cam 260 to translate relative to first end of the scissor linkage 242. Springs 254 push apart the first ends of the first elongate member 246 and the second elongate member 248. A second end of the second elongate member 248 can be pivot about an anchor (e.g., anchored relative to the second pivot 204). A second end of the first elongate member 246 can be connected to a first feedback link 258.

As the piston 210 and conical cam 260 move relative to the scissor linkage 242, the first ends of the first elongate member 246 and the second elongate member 248 will move toward or away from each other in the direction of arrow E. The second ends of the first elongate member 246 and the second elongate member 248 will move in an opposite direction. For example, if the piston 210 and the conical cam 260 move in the direction of arrows D and H, then the first ends of the first elongate member 246 and the second elongate member 248 will move away from each other in the direction of arrow E. At the same time, the second ends of the first elongate member 246 and second elongate member 248 will move toward each other. As discussed above, the second end of the second elongate member 248 can be fixed in place by anchor 256. Put differently, the second end of the second elongate member 248 can pivot about the anchor 256, but cannot translate relative to the anchor 256. Thus, any movement between the second ends of the first elongate member 246 and the second elongate member 248 is transmitted to the first feedback link 258. Continuing the example above, movement of the second ends of the first elongate member 246 and the second elongate member 248 toward one another results in the feedback link moving in the direction of arrow F.

Movement of the first feedback link 258 can be communicated to a second feedback link 240. The second feedback link 240 can be pivotably connected to anchors 272, and movement of the second feedback link 240 can thereby be transmitted to feedback rods 265. The feedback rods 265 can be connected to springs 264, which can push on a feedback wire 266 of each servo valve 222. An additional spring 268 can be connected to a fixed anchor 270. The additional spring 268 can provide a biasing force that tends to move the feedback rods 265 toward a centered position. The feedback wire 266 can be connected to the flexure sleeve 228. As discussed above, a current can be applied to an armature 226 of each servo valve 222 to cause the armature 226 to twist in the direction of arrow A. In various embodiments, a fixed amount of current or voltage can be applied to the armature 226 to results in a certain deflection (and ultimately movement of the piston 210). For example, one volt applied to the armature 226 may result in one inch of displacement of the piston 210 (from a centered position), two volts applied to the armature 226 may result in two inches of displacement of the piston 210, etc. The springs 264 apply a force to the feedback wire 266 and ultimately to the flexure sleeves 228 that can cancel out the electromagnetic force acting on the armature 226. Continuing the example, as the piston 210 achieves a 1 inch displacement, the resulting movements of the scissor linkage 242, the first feedback link 258, and the second feedback link 240 results in movement of the springs 264 and spring forces that cancel out electromagnetic forces from the armature 226 acting on the flexure sleeves 228. As a result, the servo valves 222 will close, thereby stopping the flow of hydraulic fluid to and from the chambers 212 in 214 of the cylinder 208.

When the electrical signal that deflected the piston 210 is removed from the armatures 226 (e.g. when a master controller wants to center the piston 210 or if the controller loses power), the springs 264 will push the feedback wires 266 and the flexure sleeves 228 in an opposite direction (in the direction of arrow C), causing hydraulic fluid to flow in an opposite direction to move the piston 210 back to a centered position.

Figure 3A:
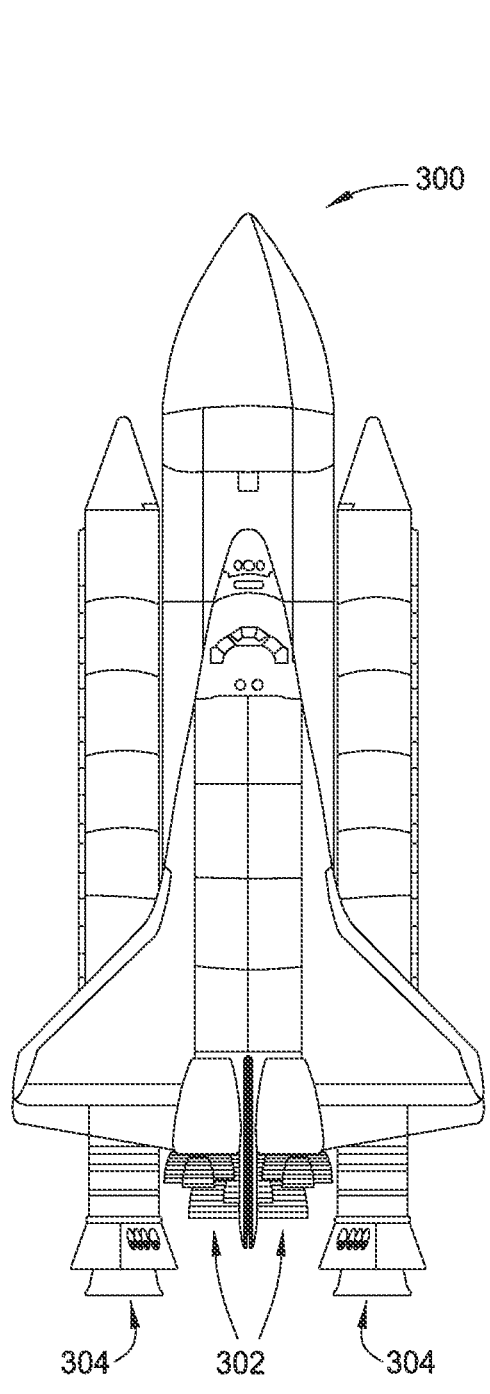
FIG. 3A is an illustration of the Space Shuttle.
Figure 3B:
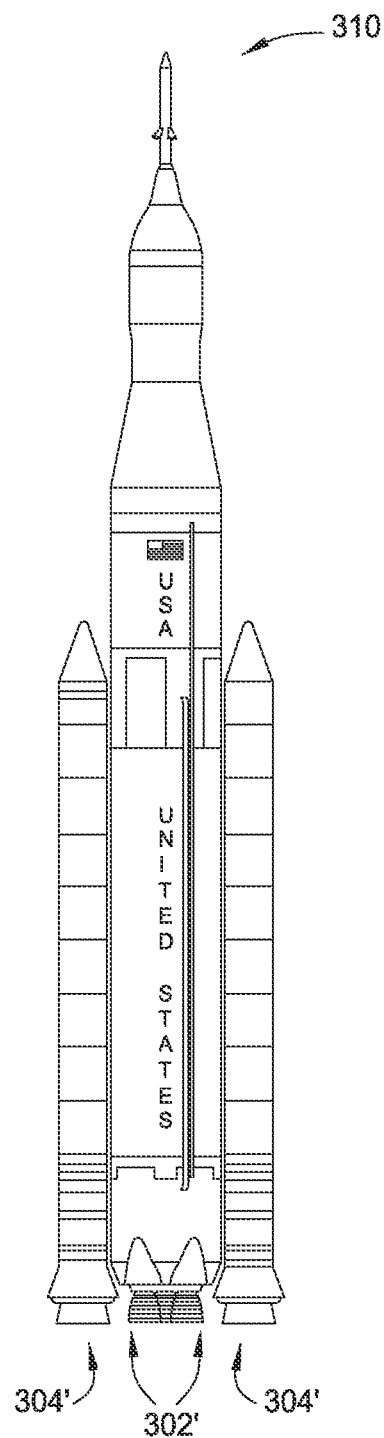
FIG. 3B is an illustration of the Space Launch System.

As discussed above, the springs 254 push the first elongate member 246 and the second elongate member 248 outwardly such that the rollers 250 and 252 remain in contact with the conical surface 262 of the conical cam 260. Referring now to FIGS. 3A and 3B, in a relatively low-vibration environment, the springs 254 may be sufficient to provide contact between the rollers 250 and 252 and the conical surface 262 of the conical cam 260. For example, FIG. 3A is a front view of the space shuttle 300 configured for liftoff. The space shuttle 300 includes three liquid rocket engines, similar to the engine 102 shown in FIG. 1, and two solid rocket boosters 304. As can be seen in FIG. 3A, the liquid fuel engines 302 of the space shuttle 300 are arranged significantly higher than the solid rocket booster engines 304. As a result, the liquid fuel engines 302 are subject to a relatively small amount of vibration produced by exhaust gases leaving the solid rocket booster engines 304. In other applications, such liquid fuel engines may be exposed to higher levels of vibration. For example, FIG. 3B illustrates the Space Launch System (SLS) 310 being developed by the Boeing Corporation. In the SLS 310, the liquid fuel engines 302' and solid rocket booster engines 304' are aligned with one another. As a result, the liquid fuel engines 302' may be subject to significantly higher levels of vibration from the solid rocket boosters 304'. Such increased levels of vibration may induce harmonic vibration in the springs 254 of the scissor linkage 242. Such harmonic vibrations may cause the rollers 250 and 252 of the scissor linkage 242 to lose contact with the conical surface 262 of the conical cam 260. As a result, the mechanical feedback actuator 200 would not receive feedback for control of the piston 210, which could result in control excursions of the engine 102.

Figure 4B:
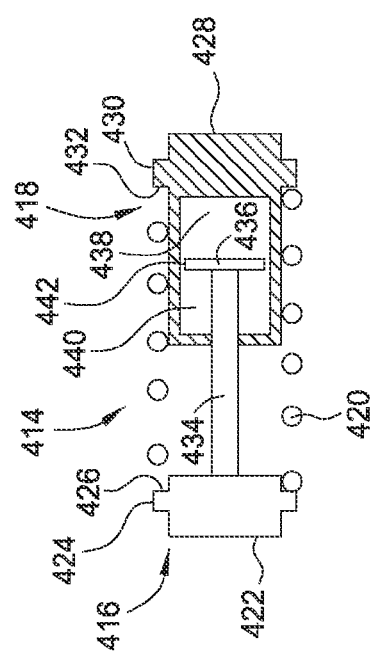
FIG. 4B is a cross-sectional side view of a spring and damper for the scissor linkage of FIG. 4A.
Figure 4A:
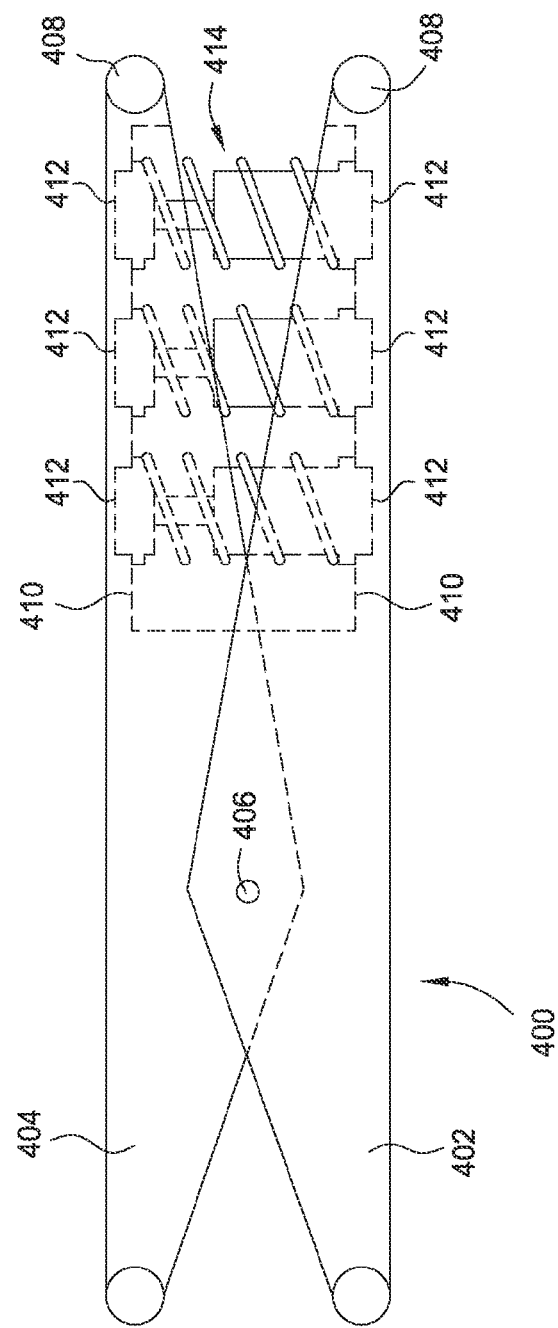
FIG. 4A is a side view of a scissor linkage for use in a hydromechanical servoactuator, wherein the scissor linkage includes three springs and dampers shown in partial hidden view.

FIGS. 4A and 4B illustrate an embodiment of a scissor linkage 400 for use in a high vibration environment, such as the environment for the liquid fuel engines 302' for the SLS 310. The scissor linkage includes a first elongate member 402 and a second elongate member 404, which are pivotable relative to one another about a pivot 406. The first elongate member 402 includes a roller 408 that can interact with the conical cam 260. Similarly, the second elongate member 404 includes a roller 408 that can interact with the conical cam 260. The first elongate member 402 and the second elongate member 404 can define an internal volume 410 that can house one or more spring/damper units 414. The internal volume 410 can include recesses 412 that hold ends of the spring/damper units 414.

FIG. 4B illustrates a partial cross-sectional view of a spring/damper unit 414 for use with the scissor linkage 400. The spring/damper 414 can include a first body 416 and a second body 418. The first body 416 can include an end 422 that can interface with a recess 412 in the first elongate member 402 or the second elongate member 404. Similarly, the second body 418 can include an end 428 that can interface with a recess 412 in the first elongate member 402 were the second elongate member 404. The first body 416 can include a lip 424 and a seat 426 and the second body can include a lip 430 and a seat 432. The spring 420 can rest against and be captured by the seats 426 and 432. The connecting rod 434 can extend from the first body 416 and terminate with a piston 436. The piston 436 and a portion of the connecting rod 434 can be arranged in the second body 418. The second body 418 can define a cavity 438 and 440 in which the piston 436 can move. The cavity 438, 440 can be filled with a fluid (e.g., a damping oil) that resists movement of the piston 436. The piston 436 can include one or more orifices 442 through which the damping fluid can pass as the piston moves within the cavity 438 and 440. For example, FIG. 4B illustrates the orifice as an annular orifice between the piston 436 and walls of the cavity 438 and 440.

In one embodiment, the spring 420 can have an outer diameter of one half of an inch and the wire diameter can be 0.047 inches. The spring 420 can have a free length of 1.125 inches and, when installed between the seats 426 and 432, and installed length of 1 inch. The spring rate for the spring 420 can be 7.46 pounds per inch. In various other embodiments, the spring 420 can have different dimensions and/or spring rates.

In one embodiment, the piston 436 can have a diameter of 0.1875 inches. The piston 436 can define two apertures, each aperture having a diameter of 0.03125 inches. The piston 436 can have a total stroke in the cavities 438 and 440 of 1.12 inches. The cavities 438 and 440 can be filled with an 80 weight, silicon-based oil. The resulting damper can have a damping coefficient of 5.345 Lbf-second/inch. In various other embodiments, the damping coefficient can be between 5.3 Lbf-second/inch and 5.4 Lbf-second/inch. In various other embodiments, the damping coefficient can be between 5 Lbf-second/inch and 6 Lbf-second/inch. In various other embodiments, the damper can have different dimensions and/or damping coefficients.

The combined spring/damper can be critically damped (i.e., have a damping ratio of 1), overdamped (i.e., have a damping ratio of greater than 1), or underdamped (i.e., have a damping ratio of less than 1). In various embodiments, the spring rate and damping coefficient can be chosen such that the damping ratio is as close to 1 as possible.

The damper can dampen any resonant vibrations in the springs, thereby preventing the scissor linkage 400 from losing contact with the conical cam 260 in a high vibration environment. In the embodiment shown in FIG. 4A, the dampers are co-located with the springs 420. In various other embodiments, the dampers can be located next to (i.e., side-by-side with) the spring 420. Also, a scissor linkage 400 can include any number of springs and dampers. For example, in certain embodiments, a scissor linkage may include a single spring and a single damper, two springs and two dampers, or other numbers of springs and dampers.

Dampers can also be incorporated into other springs in such a mechanical feedback actuator, such as actuator 200 shown in FIG. 2. For example, dampers could be incorporated into the springs 264 and 268 in the feedback rods 265 to dampen any resonant vibrations of those springs.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

While the foregoing is directed to embodiments of the present invention, other and further embodiments of the invention may be devised without departing from the basic scope thereof, and the scope thereof is determined by the claims that follow.

What is claimed is:

1. A mechanical feedback actuator, comprising:
a movable actuator;
a controller configured to control movement of the movable actuator;
a cam surface movable with the movable actuator; and
a mechanical feedback linkage arranged in contact with the cam surface, wherein the mechanical feedback linkage moves relative to the controller in response to movement of the movable actuator and cam surface, wherein a position of the feedback linkage relative to the controller indicates a position of the movable actuator to the controller;
at least one spring arranged in contact with the mechanical feedback linkage to exert a biasing force on the mechanical feedback linkage toward the cam surface; and
at least one damper arranged in contact with the mechanical feedback linkage to exert a damping force on the mechanical feedback linkage.

2. The mechanical feedback actuator of claim 1, wherein the cam surface comprises a conical cam with an inner conical surface, and wherein the mechanical feedback linkage comprises a scissor linkage, the scissor linkage including:
a first elongate member and a second elongate member that are pivotable relative to each other;
wherein first ends of the first elongate member and the second elongate member are arranged in contact with the inner conical surface, wherein the first ends are movable toward and away from each other, wherein second ends of the first elongate member and the second elongate member are movable toward and away from each other, and wherein at least one of the second ends moves relative to the controller;
wherein the at least one spring comprises at least one spring arranged between the first ends of the first and second elongate members, wherein the at least one spring exerts a force to move the first ends toward the inner conical surface; and
wherein the at least one damper comprises at least one damper arranged between the first ends.

3. The mechanical feedback actuator of claim 2, wherein the at least one spring comprises a spring rate of greater than 7.2 pounds per inch.

4. The mechanical feedback actuator of claim 2, wherein the at least one damper comprises a damping coefficient between 5.3 Lbf-second/inch and 5.4 Lbf-second/inch.

5. The mechanical feedback actuator of claim 1, further comprising:
a second spring arranged between the mechanical feedback linkage and the controller; and
a second damper arranged between the mechanical feedback linkage and the controller.

6. The mechanical feedback actuator of claim 1, wherein the at least one spring and the at least one damper are arranged coaxially.

7. The mechanical feedback actuator of claim 1, wherein a spring is arranged next to a damper.

8. A servo actuator, comprising:
a hydraulic actuator;
a controller configured to output control signals;
an electrohydraulic servovalve in hydraulic communication with the hydraulic actuator, wherein the electrohydraulic servovalve is in communication with the controller, wherein the control signals to the electrohydraulic servovalve direct hydraulic fluid to the hydraulic actuator to actuate the hydraulic actuator;
a mechanical feedback member arranged in contact with the hydraulic actuator, wherein the mechanical feedback member moves relative to the electrohydraulic servovalve in response to movement of the hydraulic actuator, wherein a position of the mechanical feedback member relative to the electrohydraulic servovalve indicates a position of the hydraulic actuator to the electrohydraulic servovalve;
at least one spring arranged in contact with the mechanical feedback member to exert a biasing force on the mechanical feedback member toward the hydraulic actuator; and
at least one damper arranged in contact with the mechanical feedback member to exert a damping force on the mechanical feedback member.

9. The servo actuator of claim 8, wherein the hydraulic actuator comprises a conical cam with an inner conical surface, and wherein the mechanical feedback member comprises a scissor linkage, the scissor linkage comprising:
a first elongate member and a second elongate member that are pivotable relative to each other;
wherein first ends of the first elongate member and the second elongate member are arranged in contact with the inner conical surface, wherein the first ends are movable toward and away from each other, wherein second ends of the first elongate member and the second elongate member are movable toward and away from each other, and wherein at least one of the second ends moves relative to the electrohydraulic servovalve;
wherein the at least one spring comprises at least one spring arranged between the first ends of the first and second elongate members, wherein the at least one spring exerts a force to move the first ends toward the inner conical surface; and
wherein the at least one damper comprises at least one damper arranged between the first ends.

10. The servo actuator of claim 9, wherein the at least one spring comprises a spring rate of greater than 7.2 pounds per inch.

11. The servo actuator of claim 9, wherein the at least one damper comprises a damping coefficient between 5.3 Lbf-second/inch and 5.4 Lbf-second/inch.

12. The servo actuator of claim 8, further comprising:
a second spring arranged between the mechanical feedback member and the electrohydraulic servovalve; and
a second damper arranged between the mechanical feedback member and the electrohydraulic servovalve.

13. The servo actuator of claim 8, wherein the at least one spring and the at least one damper are arranged coaxially.

14. The servo actuator of claim 8, wherein a spring is arranged next to a damper.

15. A scissor linkage for providing mechanical feedback between an actuator and a controller, the scissor linkage comprising:
a first elongate member that includes a first end, a second end, and a first pivot arranged between the first end and the second end;
a second elongate member that includes a third end, a fourth end, and a second pivot arranged between the third end and the fourth end, wherein the first pivot and the second pivot are coaxial with each other, and wherein the first elongate member and the second elongate member pivot relative to each other about the respective pivots;
at least one spring arranged between the first elongate member and the second elongate member, wherein the at least one spring is arranged between the first end and the first pivot of the first elongate member and between the third end and the second pivot of the second elongate member, and wherein the at least one spring exerts a force to push the first end and the third end away from each other; and
at least one damper arranged between the first elongate member and the second elongate member, wherein the at least one damper is arranged between the first end and the first pivot of the first elongate member and between the third end and the second pivot of the second elongate member.

16. The scissor linkage of claim 15, wherein the at least one spring comprises a spring rate of greater than 7.2 pounds per inch.

17. The scissor linkage of claim 15, wherein the at least one damper comprises a damping coefficient between 5.3 Lbf-second/inch and 5.4 Lbf-second/inch.

18. The scissor linkage of claim 15, wherein the at least one spring and the at least one damper are arranged coaxially.

19. The scissor linkage of claim 15, wherein a spring is arranged next to a damper.

20. The mechanical feedback actuator of claim 1, wherein the damper is a fluid damper.

\* \* \* \* \*